United States Patent [19]

Dove et al.

[11] Patent Number: 4,739,342

[45] Date of Patent: Apr. 19, 1988

[54] CROSSED-ELEMENT MAGNETOGRAPHIC PRINT HEAD

[75] Inventors: Derek B. Dove, Mount Kisco; George E. Keefe, Montrose; Edward J. Yarmchuk, Mahopac, all of N.Y.

[73] Assignee: International Business Machines Corporation, Armonk, N.Y.

[21] Appl. No.: 44,913

[22] Filed: Apr. 30, 1987

[51] Int. Cl.[4] ..... G01D 15/10

[52] U.S. Cl. ..... 346/74.5; 346/74.2

[58] Field of Search ..... 346/74.5, 74.2, 139 C; 360/110, 115, 121, 122, 125; 358/301; 400/119; 101/DIG. 5

[56] References Cited

U.S. PATENT DOCUMENTS

| | | | |
|---|---|---|---|
| 2,841,461 | 7/1958 | Gleason | 346/74.5 |
| 3,157,748 | 11/1964 | Eldredge | 346/74.5 |
| 3,161,862 | 12/1964 | Williams | 346/74.5 |
| 3,182,296 | 5/1965 | Baldwin, Jr. et al. | 346/74.5 |
| 3,195,115 | 5/1965 | Bradley | 346/74.5 |
| 3,196,416 | 7/1965 | Williams | 346/74.5 |
| 3,278,913 | 10/1966 | Raffel | 346/74.5 |
| 3,348,931 | 10/1967 | Reekstin, Jr. | 346/74.5 |
| 3,386,101 | 5/1968 | Sims, Jr. | 346/74.5 |
| 3,445,830 | 5/1969 | Middlehoek | 346/74.5 |
| 3,490,011 | 1/1970 | Ransom | 346/74.5 |
| 3,707,706 | 12/1972 | Kefalas | 346/74.5 |
| 3,890,623 | 6/1975 | Schmid et al. | 346/74.5 |
| 4,001,841 | 1/1977 | Berkowitz | 346/74.5 |
| 4,072,957 | 2/1978 | Kokaji et al. | 346/74.5 |
| 4,097,871 | 6/1978 | Berkowitz et al. | 346/74.5 |
| 4,158,213 | 6/1979 | Griffith | 346/74.5 |
| 4,176,362 | 11/1979 | Nelson | 346/74.5 |
| 4,257,051 | 3/1981 | Lindsay et al. | 346/74.5 |
| 4,291,314 | 9/1981 | Nathan et al. | 346/74.5 |
| 4,339,760 | 7/1982 | Wang et al. | 346/74.5 |
| 4,342,039 | 7/1982 | Wang | 346/74.5 |
| 4,442,441 | 4/1984 | Kikuchi et al. | 346/74.5 |
| 4,470,051 | 9/1984 | Springer | 346/74.5 |
| 4,503,439 | 3/1985 | Springer | 346/74.5 |
| 4,525,724 | 6/1985 | Franaszek et al. | 346/74.5 |

*Primary Examiner*—Arthur G. Evans

*Attorney, Agent, or Firm*—Perman & Green

[57] ABSTRACT

A magnetographic printing head comprises an array of crossed elongated bar-shaped print elements, each of which is individually magnetizable by electrical conductors wound about respective ones of the print elements. The print elements are arranged in two parallel arrays which are spaced apart from each other to define a passage through which a magnetic medium is to be passed for the imprinting of marks thereon. A mark can be imprinted at each cross point of the crossed arrays upon application of sufficient magnetizing current to each of the print elements at the cross point. The print elements are specifically shaped to provide for concentration of magnetic fields at the cross points in two dimensions to accomplish high resolution printing. The concentration of the fields is accomplished in one embodiment of the invention by the use of a knife-edge configuration to opposed facing surfaces of the elements of the opposed arrays, and in a second embodiment by a set of pedestals upstanding from the elements of one of the arrays. The resulting configuration of the print head has structural simplicity which permits economical fabrication while retaining high resolution in the printing.

27 Claims, 5 Drawing Sheets

FIG. 2
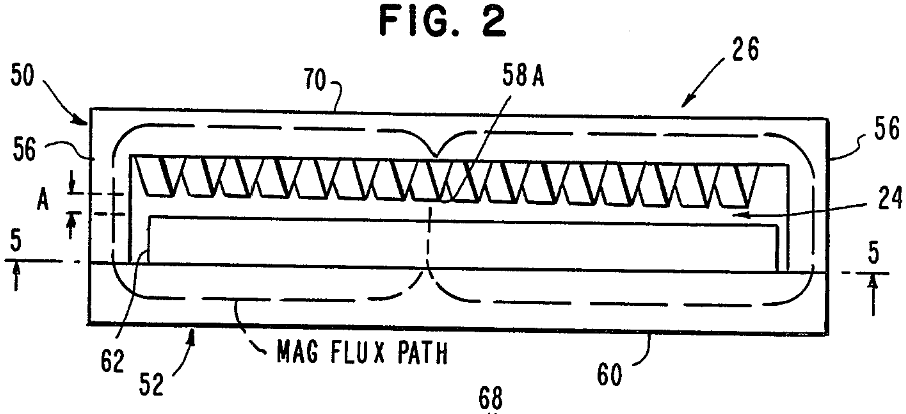
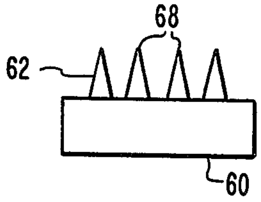
FIG. 3
FIG. 4
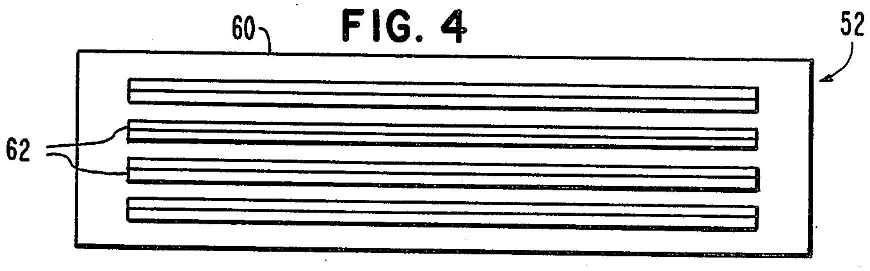
FIG. 5
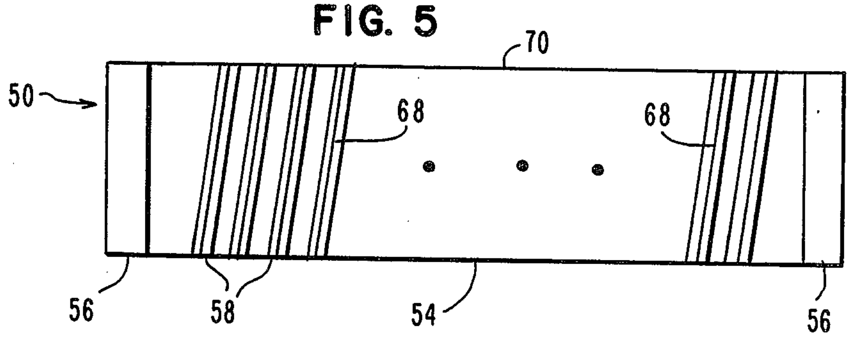

FIG. 9
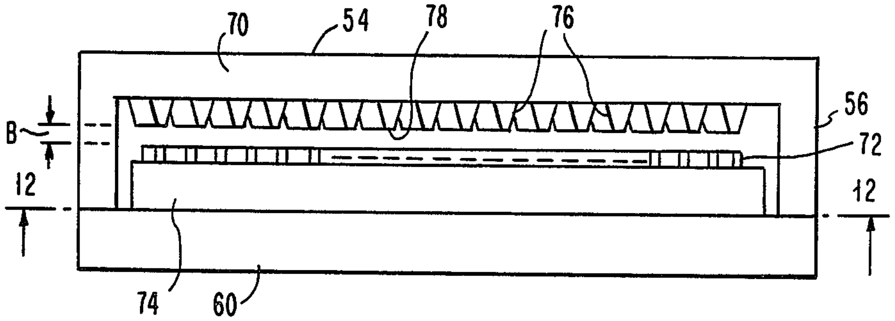
FIG. 10
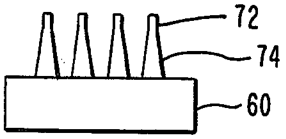
FIG. 11
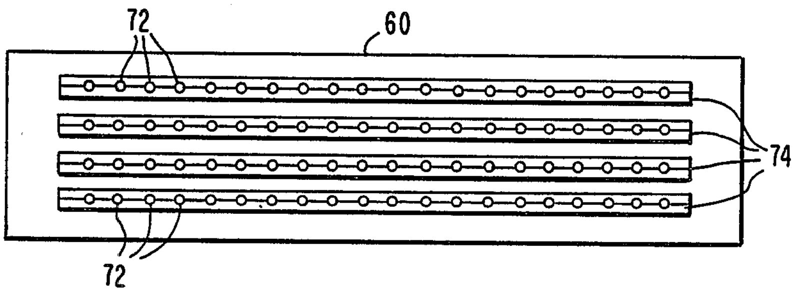
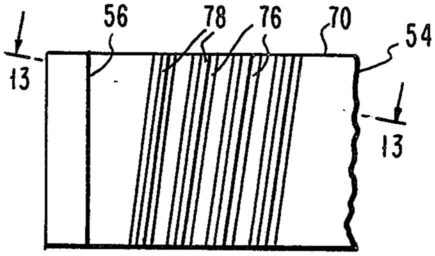
FIG. 12
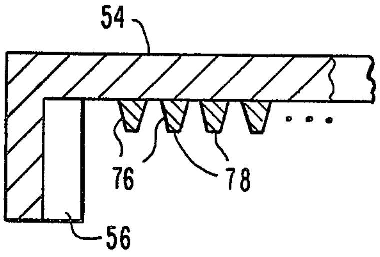
FIG. 13

CROSSED-ELEMENT MAGNETOGRAPHIC PRINT HEAD

BACKGROUND OF THE INVENTION

This invention relates to print heads for the magnetographic printing of images and, more particularly, to a print head constructed of crossed arrays of elongated magnetizable bars wherein individual picture elements, or pixels are formed on a magnetic medium at the intersections of the bars of the two arrays, the particular pixels being addressed by selective magnetization of bars in each of the arrays. This construction of the print head reduces complexity and cost while retaining high resolution.

Magnetrographic printing systems employ a print head, a magnetizable medium, and a toner for producing an image on a sheet of paper or other hard copy material. The magnetic medium may be carried upon a drum or upon a tape. Typically, the magnetic medium is coated upon the drum or the tape. A common form of print head comprises an array of magnet cores which are interlaced with a set of electric conductors. The magnetic cores, in cooperation with the electric conductors, form electromagnets which are selectively energizable by application of electric currents to selected ones of the electric conductors.

The print head is positioned alongside of the surface of the magnetic medium to allow each of the electromagnets to impart a magnetic field to the medium in a region directly beneath the terminus, or print-element portion, of a magnetic core, thereby to write a mark upon the magnetic medium. Energization of various ones of the electromagnets results in the formation of a set of marks on the magnetic medium, which set of marks constitute an image written on the medium by the print head. The material of the magnetic medium has sufficient coercivity so as to retain a state of magnetization until a magnetic field applied by print elements of the print head attains sufficient strength to alter the state of magnetization. Thereby, the region of a pixel is left blank or is imprinted only when a sufficient magnetic field is developed by the currents flowing in the electric conductors. The magnetic image is rendered visible by toning with magnetic ink, which ink is attracted by the local magnetic fields of the magnetically written regions. The toner is then transferred to the paper to produce the image on the paper.

In many printing applications, it is desirable to produce a high-resolution image. By way of example, such high-resolution imaging is required in the printing of small detailed characters, such as a 9-point text. A further example is the case of the printing of a picture wherein fine detail is to be rendered. In order to accomplish fine-resolution printing rapidly, it is desirable to construct a print head having an array of many closely spaced small print elements, the size of the print elements being commensurate with the smallest detail to be rendered.

A problem arises in that the construction of a print head of closely-spaced high-resolution print elements. Heretofore, both the print elements and their corresponding electrical activation conductors had to be constructed using expensive high-resolution processing technology, and since the conductors have to be electrically continuous over relatively long distances, this high-resolution processing had to be done over a large area. These considerations have made large, page-wide, high-resolution print heads unduly complex and, consequently, expensive to produce.

SUMMARY OF THE INVENTION

The aforementioned problem is overcome and other advantages are provided in a magnetographic printing system employing a print head constructed in accordance with the invention. A magnetizable medium is passed through the print head to receive all pixels of an image in a high-resolution format. The print head is formed of two arrays of elongated magnetizable bars, wherein, in each array bars are arranged parallel to each other. One array is placed on top of the other array to form a two-dimensional array of cross points. The bars of one array are arranged slightly offset from perpendicularity to the bars of the other array, thereby to introduce a slight offset in a line of cross points relative to a direction of motion of the medium. Individual ones of the bars in each array are selectively magnetized by currents conducted by electric conductors encircling the respective bars. At a cross point between a pair of bars, the resulting magnetic field is intensified. The magnetic medium is passed between the two arrays of bars with the result that, at each cross point, a pixel can be imprinted on the magnetic medium by the selective magnetization of the bars. By using many bars in the print head, a large two-dimensional array of pixel locations can be provided, with individual pixels being addressable by the magnetization of a pair of bars intersecting at the pixel location. In a preferred embodiment of the invention, the print head has a sufficient number of bars to extend across the width of the magnetic medium so as to obviate the need for a shuttle motion back and forth across the medium as the medium is advanced in the longitudinal direction through the print head. A vertically oriented magnetizable medium is preferred for highest resolution.

In one embodiment of the invention, one edge of each bar of the first array faces the corresponding edge of the bars in the second array. The facing edges of the bars are constructed as knife edges. The edge of a bar concentrates the magnetic field in one direction to produce high resolution in one direction. Since the bars in one array are approximately perpendicular to the bars in the other array, the foregoing concentration of the flux provides for high resolution in two dimensions.

In a second embodiment of the invention, the facing edges of one set of bars is provided with a set of pedestals extending towards the facing edges of the opposite set of bars. In order to facilitate alignment of the pedestals with the bars of the second array, the facing edges of the bars of the second array are widened substantially beyond the diameters of the pedestals, preferably by a ratio of 10:1. The pedestals provide for a two-dimensional concentration of flux at the point wherein the flux penetrates through the magnetic medium.

In both embodiments of the invention, the bars in each of the arrays may be enclosed within a potting material such as a layer of polyimide or wear-resistant epoxy which are electrically insulating and non-magnetic, the potting material providing smooth surfaces to the elements of the print head alongside the magnetic medium, and also providing for insulation of electrical conductors from metal of the bars, such as nickel and iron, which may be employed in the construction of the bars. Both embodiments of the invention provide a high resolution image, while reducing complexity of structure which permits fabrication of the print head economically.

BRIEF DESCRIPTION OF THE DRAWING

The aforementioned aspects and other features of the invention are explained in the following description, taken in connection with the accompanying drawings wherein:

FIG. 2 is a front elevation view of the print head of FIG. 1;

FIG. 3 is an end view of a bottom print assembly of the printing print head of FIG. 2;

FIG. 4 is a plan view of the bottom print assembly of FIG. 2;

FIG. 5 is a plan view looking upward, along the line 5—5 in FIG. 2, of a top print assembly of the print head;

FIG. 9 is a front elevation view of the print head in an alternative embodiment of the invention wherein the bottom print elements are formed as bars with pedestals extending therefrom;

FIG. 10 is an end view of the bottom print assembly of the print head of FIG. 9;

FIG. 11 is a plan view of the bottom print assembly of FIG. 9;

FIG. 12 is a fragmentary plan view looking up at the top print assembly of the print head along the line 12—12 of FIG. 9; and FIG. 13 is a sectional view of the top print assembly taken along the line 13—13 in FIG. 12 to show flat edges of the top print elements of the second embodiments of the invention.

DETAILED DESCRIPTION

Figure 1:
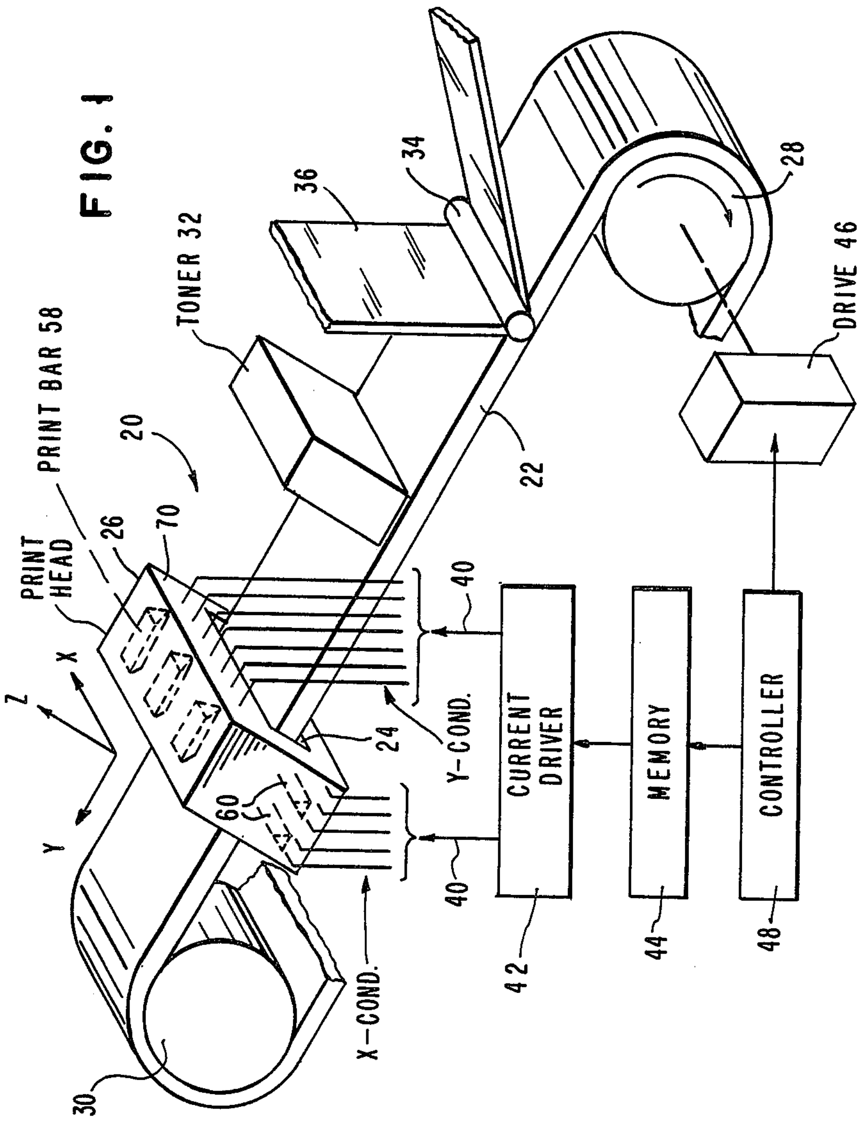
FIG. 1 is a stylized view of a printing system employing a magnetographic printing head embodying the invention.

FIG. 1 shows a simplified view of a magnetographic printing system 20 for demonstrating use of a print head constructed in accordance with the invention. The system 20 employs a magnetic medium in the form of a tape 22 which is carried through a passage 24 in a print head 26 by a drive drum 28 an an idler drum 30. The print head 25 is constructed in accordance with the invention for imprinting marks magnetographically on the magnetic medium of the tape 22. The system 20 includes a toner dispenser 32, and an assembly including a roller 34 for guiding a sheet 36 of paper along the tape 22 during movement of the tape 22 past the head 26. A drive unit 46 rotates the drive drum 28 to transport the tape 22 from the print head 26 past the dispenser 32 to the sheet 36 at the roller 34.

In operation, the print head 26 prints marks magnetically upon the tape 22. The imprinted region of the tape 22 passes from the head 26 to the dispenser 32 for receiving toner, and then passes further to the paper sheet 36 for transferring an image to the paper sheet 36. The toner from the dispenser 32 adheres to locations on the magnetic medium of the tape 22 at sites wherein there are changes of magnetic field, which changes in magnetic field are brought about by magnetic fields impressed upon the tape 22 by the print head 26. Thereby, the locations of particles of the toner conform to the image. Upon transference of the toner to the paper sheet 36, the image appears on the paper sheet 36.

In accordance with the invention, the print head 26 includes electric conductors 40 arranged in two sets, one set being composed of x conductors and the other set being composed of y conductors, where x and y represent axes of a reference coordinate system shown in FIG. 1. The conductors 40 are energized with current by a current driver 42 which includes individual well-known drive circuits (not shown) for imparting pulses of current to respective ones of the conductors 40. A memory 44 stores information for directing a selection and a pulsing of individual electromagnets of the print head 26, as will be described below, for generating individual pixels of the image. The memory 44 outputs command signals to the current driver 42 for activating the requisite ones of the conductors 40 for printing a mark upon the tape 22. A drive unit 46 rotates the drum 28 for moving the tape 22 through the head 26. Operation of the memory 44 is coordinated with the rotation of the drum 28 by a controller 48 coupled to both the memory 44 and to the drive unit 46. Coordination of the drum rotation and the activation of the print head 26 is well known and is currently employed in magnetographic printers.

FIGS. 2-8 explain the construction of the print head 26 in accordance with a first embodiment of the invention. The print head 26 comprises a top print assembly 50 and a bottom print assembly 52. The top print assembly 50 comprises a top plate 54 having end walls 56 extending perpendicularly thereto, and a set of top print elements formed as bars 58 extending from an inner surface of the top plate 54 towards a central portion of the passage 24. The bottom print assembly 52 comprises a bottom plate 60 with a set of bottom print elements thereon facing the top print elements, the bottom print elements being formed as bars 62 which extend upwardly from the botom plate 60 towards the center of the passage 24. The print bars 58 and 62 are shown partially in phantom in FIG. 1.

Figure 6:
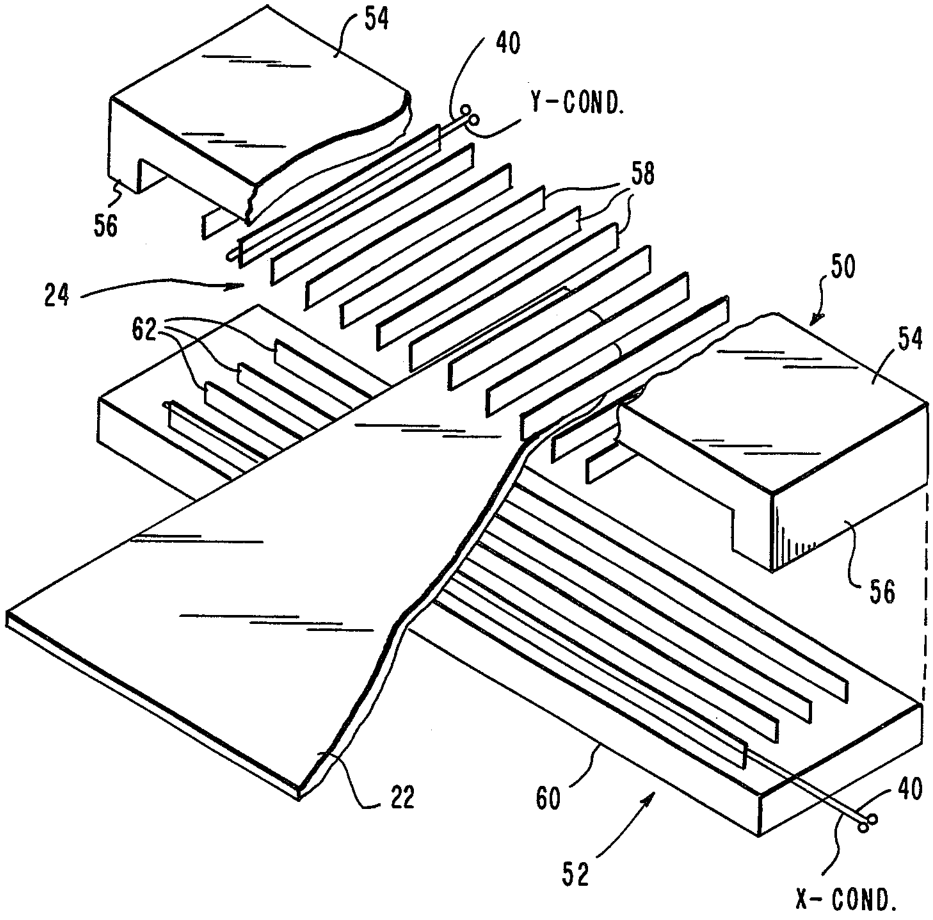
FIG. 6 is an exploded isometric view of the print head, a portion of the top print assembly thereof being partially cut away to expose print bars of the top print assembly and to facilitate a showing of a magnetic medium passing between upper and lower print bars of the print head.

The bottom bars 62 are arranged parallel to each other and are directed in the x direction transverse to the direction of movement of the tape 22. (FIG. 1). The top bars 58 are arranged parallel to each other and are inclined slightly to the y coordinate axis. As shown best in FIGS. 6 and 7, the emplacement of the array of top bars 58 above the array of bottom bars 62 creates an array of cross points 64 which are formed in a projection of the arrays of the top and the bottom print elements upon the tape 22. The inclination of the top print elements relative to a state of perpendicularity with the bottom print elements provides for an indentation of successive rows of the cross points 64. As will be explained hereinafter, each of the print elements may be magnetized in the manner of an electromagnet by current in the conductors 40 (FIGS. 1 and 6). Activation of a single bottom print element or a single top print element is insufficient to overcome the coercivity of the magnetic medium of the tape 22. However, the joint activation of magnetic fields in both a top print element and a bottom print element introduces a sufficiently strong magnetic field in the region of the cross point 64 of the two activated print elements to overcome the magnetic coercivity of the tape 22 to imprint a mark in the magnetic medium of the tape 22.

The sense or direction of a magnetic field applied by a print element at a cross point 64 is dependent on the direction of an electric current in a conductor 40 encircling the print element. The combined magnetic field produced by both print elements at a cross point 64 is the algebraic sum of the fields of the individual print elements. Depending on the directions of the currents in the conductors 40 of the respective print elements, the combined magnetic field at a cross point 64 may be greater or less than a threshold for overcoming the magnetic coercivity of the tape 22 for imprinting a mark, or leaving a blank space on the tape 22.

Figure 8:
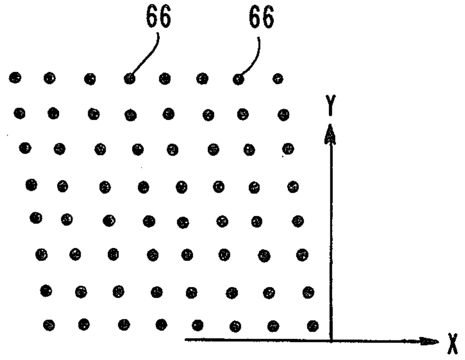
FIG. 8 shows an array of marks imprinted on magnetic medium by activation of all cross points on the array of print elements of FIG. 7.

FIG. 8 shows an array of all possible marks 66 which may be imprinted by selective activation of the print elements for each of the cross points 64 when the tape 22 is stationary. During movement of the tape 22 past the head 26, the marks 66 can be selectively interleaved in successive rows of printing a dot matrix form of image to produce an accurate, fine resolution image. The x-y coordinate axis system is superposed upon the array of the marks 66 to show the effect of the indentation of successive rows of the marks 66 corresponding to the inclination of the top print elements relative to a perpendicular relationship with the bottom print elements. The rows of marks 66 are parallel to the x axis. Upon movement of the tape 22 in the y direction, marks 66 from various ones of the rows and the column of the print elements may be imprinted on a line of print, parallel to the x axis, to provide all points of an image being produced by the print head 26.

By use of the inclined array of cross points 64, the marks 66 can be provided with a diameter which is much smaller than the spacing between successive ones of the cross points 64. The offsetting of the successive rows of the cross points 64 produces for the emplacement of marks 66 at locations between the cross points 64 in a row of the cross points upon translation of the tape 22 past the head 26. Thereby, by using a sufficient number of bottom print elements, the marks 66 may be positioned as close together as desired up to physical limitations in the geometry of the individual print bars 58 and 62. There is a sufficient number of top print elements to extend along the array of the top print elements across the width of the tape 22 and, similarly, the bottom print elements extend across the width of the tape 22 so as to permit imprinting of images by the head 26 up to the width of the tape 22 without necessitating a transverse shuttle motion (in the x direction) of the head 26 to print a full line of data on the tape 22.

The use of crossed arrays of print elements to print marks at the cross points 64 on a magnetizable medium is an important feature of the invention. The arrays of the bars 58 and 62 disposed on their respective plates 54 and 60 are readily fabricated and, furthermore facilitate a winding of the electric conductors 40 about individual ones of the top bars 58 and of the bottom bars 62. The plate 54, the end walls 56, and the bars 58 of the top print assembly 50 are fabricated, preferably of a low coercivity magnetic material such as permalloy which, as is well known, comprises an alloy of nickel and iron. The winding of the x conductors 40 about the bottom bars 62 and the y conductors 40 about the top bars 58 is demonstrated in FIG. 6 in which, by way of example, a single x-conductor has been passed around a single bar 62 in a one-turn pass, and a single y-conductor has been passed around a single top bar 58 in a one-turn pass. It is to be understood, however, that a separate conductor 40 is passed around each of the bottom bars 62 and around each of the top bars 58 in the manner described in FIG. 6. FIG. 6 has also been simplified in terms of the number of bottom bars 62 shown, the figures showing only four of these bars while, in practice more of the bars 62 are employed. In the two preferred embodiments of the invention, eight of the bottom bars 62 are employed corresponding to the diagrammatic presentations of FIGS. 7 and 8.

With reference to the passage 24 (FIGS. 1 and 6) in the print head 26, the passage 24 has the configuration of a gap between the top edges of the bottom bars 62 and the bottom edges of the top bars 58, which gap is slightly larger than the thickness of the tape 22 to permit passage of the tape 22 between the foregoing edges of the bars 62 and 58. Flux generated by the electromagnet of the selected bottom bar 62 and flux generated by the electromagnet of the selected top bar 58 pass serially along the same path through the tape 22, with a return flux path being provided through the top plate 54, the end walls 56, and the bottom plate 60. The series arrangmeent of the electromagnet provided by the selected bar 62 and the electromagnet provided by the selected bar 58 constitute a single electromagnet at the cross point 64 of the selected bars 62 and 58. Therefore, current on a x-conductor 40 and current on a y-conductor 40 may be regarded as being applied to a single magnet core, having the gap provided by passage 24, at the selected cross point 64. It is noted that the end walls 56 rest securely upon the ends of the bottom plate 60 for establishing the width of the gap in the passage 24, and also for establishing a low-relutance return path for the magnetic flux. Channels (not shown) may be provided on the top surface of the bottom plate 60 and/or on the bottom surface of the end walls 56 to provide access for the x-conductors 40 while permitting the end walls 56 to rest securely upon the bottom plate 60.

The amount of current to be impressed on the conductors 40 is dependent on the number of turns in a winding coil, and also on the gap provided by the passage 24 and the area of the intersection of the bars 62 and 58 which determine the reluctance of the magnetic circuit. By way of example, if a total of 9 ampere-turns would be required to induce a magnetic field at a cross point 64 of sufficient strength to overcome the coercivity of the tape 22, then it is preferable to divide the ampere-turns between the two intersecting bars such that 6 ampere-turns is provided on one of the bars and 3 ampere-turns is provided on the other of the bars. The electric currents provided by the current driver 42 and the memory 44 (FIG. 1) provide the foregoing 9 ampere-turns for activating the total magnetic field at a cross point 64. This is accomplished by impressing a current of +3 amperes on the selected x-conductor 40, a current of −3 amperes on the other x-conductors 40, and a current of +6 amperes on the selected y-conductor 40 for activating the magnetic fields, respectively, in the bottom bar 62 and the top bar 58 of a selected cross point 64. The top bar 58 serves as the core of an electromagnet comprising the one-turn winding of the y-conductor 40 about the bar 58 and, similarly, the selected bar 62 serves as the core of an electromagnet comprising the one-turn winding of the x-conductor 40 about the selected bar 62.

In this example, 9 ampere-turns is above a threshold for altering the magnetic state of the medium of the tape 22 while the difference of the impressed magnetic field is below the foregoing threshold, as will now be described by use of both positive and negative values of current. This provides the 9 ampere-turns for activation of the selected electromagnet core represented by a cross point 64, while other such cores receive only 3 ampere-turns. The 9 ampere-turns for the selected cross point provide a field sufficient to overcome the coercivity of the magnetizable print medium of the tape 22 at the selected cross point, whereas the cross point electromagnets that receive 3 ampere-turns produce less than the required field strength for switching the magnetizable medium at the sites of these cross points, which sties of the tape 22 therefore remain unchanged in magnetic state. The foregoing current ratios provide a ratio of 3:1 for reliability in selectively magnetizing the print medium of the tape 22.

In accordance with a feature of the invention, the precise location of the flux path at a cross point 64 is obtained accurately by providing a knife edge to the print bars 58 and 62, the knife edges being located at the top of each of the bottom bars 62 and at the bottom of each of the top bars 58. Thereby, the knife edges of the upper and lower print bars face each other and are located on opposite sides of the tape 22 located within the passage 24. The gap width of the passage 24, identified as A in FIG. 2, is the distance between a plane containing the knife edges of the upper print bars and a plane containing the knife edges of the lower print bars. Also shown in FIG. 2 is a path of magnetic flux obtained by activation of a selected top bar 58A and one of the bottom bars 62. The cross-sectional shape of each of the bottom bars 62 is triangular as shown on FIG. 3. The cross-sectional shape of the top bars 58 is the same as that of the bottom bars 62. In FIG. 3 knife edges are indicated at 68. It is noted that a knife edge 68 need not be physically sharp, but should have a sufficiently small extent in a direction transverse to a bar 58, 62 to provide for a desired degree of resolution. Also, it is noted that, since a bar 62 is long in one dimension and very small (the knife edge) in the transverse direction, the geometry of the bar 62 narrows a flux path in only the transvese direction, this being the y-direction with reference to the coordinate axes of FIG. 1. Similarly, a bar 58 of the top print assembly 50 acts to narrow a path of flux in the x-direction because of the crossed relationship between the top bars 58 and the bottom bars 62. FIG. 4 shows the parallel relationship among the bottom bars 62, and FIG. 5 shows both the parallel relationship among the top bars 58 as well as the inclination of these bars relative to a front side 70 of the top plate 54.

Figure 7:
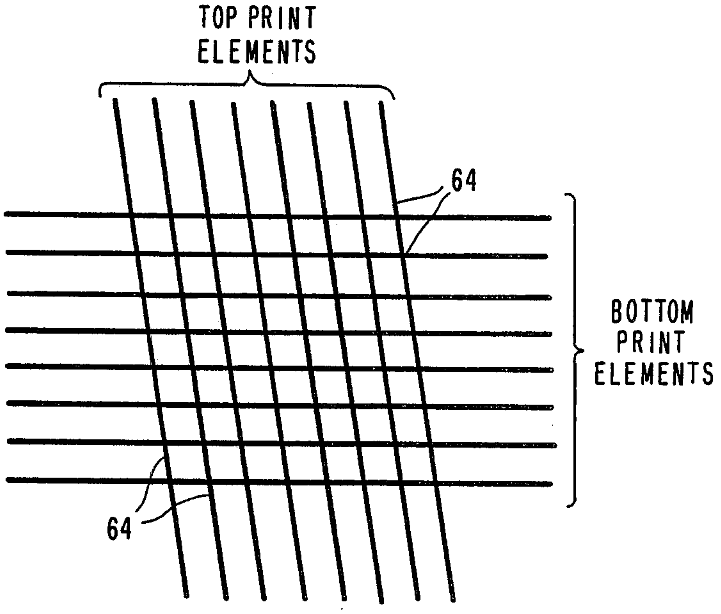
FIG. 7 is a schematic representation of the layout of an array of top print elements relative to an array of bottom print elements, the print elements taking the form of sharp edged bars and bars with pedestals in different embodiments of the invention.

In accordance with the second embodiment of the print head 26, as shown in FIGS. 9–13, the top and bottom print bars have been modified to include a set of pedestals 72 which provide a sharply defined magnetic field at each of the cross points 64 (FIG. 7). Each modified bottom print bar 74 has generally the same configuration as the previously described bottom bar 62, but differs from the bar 62 in that a line array of pedestals 72 protrudes upward from the top edge of the bottom bar 74. Modified top print bars 76 differ in cross-sectional shape from the previously described top bars 58 by the inclusion of a flat surface 78 which extends along the entire length of each top bar 76 and faces the pedestals 72. The flat surfaces 78 give a trapezoidal appearance to a cross-sectional view of the top bars 76. The locations of the top bars 76 and the bottom bars 74 on their respective plates 54 and 60 is the same as that described previously for the top bars 58 and the bottom bars 62.

As has been noted in the discussion of FIGS. 7 and 8, the array of the top print elements is inclined slightly relative to perpendicularity with the array of bottom print elements. This arrangement of the top and the bottom print elements is retained in the construction of FIGS. 9–13. Each of the pedestals 72 is to be positioned at the location of a cross point 64. Accordingly, a column of the pedestals 72, as viewed in FIG. 11, is inclined relative to perpendicularity with the bottom bars 74. The alignment of columns of the pedestals 72 corresponds in position and in orientation with respective ones of the top bars 76. Thereby, each pedestal 72 faces a a flat surface 78 of a top bar 76.

To facilitate manufacture of this embodiment of the print head, the width of the flat surfaces 78 are enlarged substantially beyond the diameters of the pedestals 72, preferably by a factor of 10:1. This facilitates alignment of pedestals 72 with the flat surfaces 78, and insures that a pedestal 72 can conduct flux to a flat surface 78 even if there be slight misalignment between the position of a pedestal 72 and the precise location of a cross point 64. The foregoing relationship of 10:1 is not indicated in the FIGS. 9–13 because the pedestals 72 have been enlarged to facilitate a showing of their structure. Accordingly, it is understood that the structure of FIGS. 9–13 relaxes the tolerances on the positions of the pedestals 72 and, thereby, facilitates construction of this embodiment of the print head. A narrow flux path is assured in both the x-dimension and the y-dimension because of the circular symmetry of each pedestal 72 about its axis, which axis is parallel to the z coordinate of FIG. 1. The pedestals 72 are preferably of cylindrical shape. Both embodiments of the print heads are capable of producing marks 66 (FIG. 8) having diameters on the order of a few mils, and to produce a density of dots or pixels on the order of hundreds of dots per inch across the paper sheet 36 (FIG. 1), better than 240 pixels being obtained in a preferred embodiment. The gap width of the passage 24, dimension A in FIG. 2 and dimension B in FIG. 9, is typically on the order of a few mils.

It is advantageous to provide a smooth surface in the passage 24 to facilitate transport of the tape 22 through the print head 16. This is readily accomplished by filling in the voids between the print bars, namely, the top and bottom bars 58 and 62 of the first embodiment and the top and bottom bars 76 and 74 of the second embodiment, with a nonmagnetic electriclaly-insulating material such as polyimide or wear-resistant epoxy. The polyimide is flexible and may be employed when it is desired to introduce flexibility to the print head 26. The wear-resistant epoxy is rigid and is composed of a matrix of ceramic particles or particles of other metal oxides embedded in epoxy resin. The conductors 40 are embedded in the epoxy or polyimide which serves to retain the conductors 40 in their positions while insulating the conductors from the metal of the top and the bottom print assemblies 50 and 52. The resulting surface is non-abrasive to the tape 22 so as to provide long life to the magnetographic printing system 20.

By way of alternative forms of construction of the conductors 40 (not shown), it is noted that an individual one of the conductors can be formed as a single strip of metal, such as copper, which is plated on one side of a bar 58, 74 such that the current passing through the strip induces a magnetic field within the bar. No insulation on the strip conductor is required because the electrical resistivity of the magnetic material, typically permalloy, is approximately ten times greater than the resistivity of the copper strip.

In view of the foregoing description, it is apparent that the physical structure of the print head provides for a highly accurate printing process while facilitating manufacture and minimizing the cost of manufacture of the print head. The design of the print head provides for ruggedness and mechanical simplicity allowing for long wear and the capacity for increased resolution and addressing of cross points of the array of print bars. The latter is accomplished by increasing the length of the y bars and increasing the number of the x bars while adjusting the intersection angle to accommodate the number and lengths of the x bars.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

Having thus described our invention, what we claim as new, and desire to secure by Letters Patent is:

1. A print head for magnetographic printing on a magnetizable medium comprising:

a first array of magnetic elements;

a second array of magnetic elements spaced apart uniformly from said first array to define a passage between said first and said second arrays for movement of said medium between said first and said second arrays, said second array being oriented in crossed relation to said first array to define a set of cross points as viewed in a projection of said arrays upon said medium; and magnetizing means for selectively magnetizing an element of said first array and an element of said second array to produce, respectively, a first magnetic field and a second magnetic field which pass between said arrays at a selected one of said crosspoints, a sum of said first and said second fields being greater than a threshold sufficient to overcome a magnetic coercivity of said medium to magnetically imprint a mark on said medium, a difference of said first and said second fields being less than said threshold.

2. A print head according to claim 1 wherein the elements of said first array and of said second array are each formed of elongated bars, each of said elements serving as print elements.

3. A print head according to claim 2 wherein said magnetizing means comprises a set of conductors of electric currents, individual ones of said conductors passing alongside individual ones of said bars to form an electromagnet at each of said print elements, which electromagnets are activatable in response to a flow of electric current in the respective conductors.

4. A print head according to claim 3 wherein each of said print elements in each of said arrays includes means for concentrating a magnetic field.

5. A print head according to claim 4 wherein, in the electromagnet of each of said print elements, the edge of a bar of one of said arrays facing a bar of the other of said arrays serves as a pole of said electromagnet, and said concentrating means in each of said print elements is disposed at a pole of said print element.

6. A print head according to claim 5 wherein said concentration means comprises a knife edge configuration of a pole, the knife edges of the elements of said first array being transverse to the knife edges of said second array to provide for a two-dimensional concentration of magnetic field at each cross point.

7. A print head according to claim 6 further comprising a top plate, a bottom plate and end walls, said top plate and said bottom plate being joined together by said end walls, said top plate supporting one of said arrays and said bottom plate supporting the other of said arrays.

8. A print head according to claim 7 wherein the elements of said first array are oriented transversely to a direction of movement of said medium, and the elements of said second array have an orientation which is inclined relative to perpendicularity with the elements of said first array.

9. A print head according to claim 8 further comprising an electrically insulating, nonmagnetic material disposed between elements of said first array and between elements of said second array to form smooth surfaces at boundaries of said passage.

10. A print head according to claim 9 wherein said conductors are embedded in said electrically insulating, nonmagnetic material, said electrically insulating, nonmagnetic material being a wear-resistant epoxy.

11. A print head according to claim 5 wherein said concentration means comprises pedestals upstanding from individual poles of the print elements of said first array, said pedestals being located at said cross points.

12. A print head according to claim 11 wherein each of said pedestals has the shape of a cylinder to provide for a two-dimensional concentration of magnetic flux at a crosspoint, cylindrical axes of said pedestals being parallel.

13. A print head according to claim 12 wherein said concentration means further comprises elongated surfaces disposed on individual poles of the print elements of said second array, said elongated surfaces being oriented normally to axes of said pedestals, the widths of said elongated surfaces being greater than a diameter of a pedestal to relax tolerances in the placement of said pedestals during a manufacturing process of the print head.

14. A print head according to claim 13 further comprising a top plate, a bottom plate and end walls, said top plate and said bottom plate being joined together by said end walls, said top plate supporting one of said arrays and said bottom plate supporting the other of said arrays.

15. A print head according to claim 14 wherein the elements of said first array are oriented transversely to a direction of movement of said medium, and the elements of said second array have an orientation which is inclined relative to perpendicularity with the elements of said first array.

16. A print head according to claim 15 wherein said pedestals are arranged in rows and columns, the rows of pedestals being parallel to the elements of said first array, and the columns of pedestals being parallel to the elements of said second array.

17. A print head according to claim 16 further comprising an electrically insulating, nonmagnetic material disposed between elements of said first array and between elements of said second array to form smooth surfaces at boundaries of said passage.

18. A print head according to claim 17 wherein said conductors are embedded in said electrically insulating, nonmagnetic material, said electrically insulating, nonmagnetic material being a wear-resistant epoxy.

19. A print head for magnetographic printing on a magnetizable medium comprising:

a crossed array of elongated print elements defining a set of cross points and being located for imparting a magnetic field to said magnetizable medium; and a set of conductors of electric currents wherein individual ones of said conductors pass alongside respective ones of said print elements, each of said conductors with its corresponding print element forming an electromagnet, said electromagnets being seclectively energizable in response to electric currents applied to the respective conductors for imparting magnetic fields at selected ones of said cross points, a direction of the magnetic field imparted by one of said electromagnets at a cross point depending on a direction of current in the conductors of said electromagnet, a combined magnetic field for imparting a mark to said medium at a cross point being an algebraic sum of the individual magnetic fields applied by individual ones of said print elements at a cross point, a sum of the magnetic fields produced by print elements at a cross point being greater than a threshold sufficient to overcome a magnetic coercivity to magnetically imprint a mark on said medium, a difference of the magnetic fields of the print elements at a cross point being less than said threshold.

20. A print head according to claim 19 wherein each of said print elements includes means for concentrating a magnetic field.

21. A print head according to claim 20 wherein:

each of said print elements is formed of an elongated bar of magnetic material;

said crossed array comprises a first parallel array of print elements oriented in a first direction and a second parallel array of print elements facing said first parallel array and oriented in a second direction transverse to said first direction; and wherein in the electromagnet of each of said print elements, the edge of a bar of one of said parallel arrays facing a bar of the other of said parallel arrays serves as a pole of said electromagnet, and said concentrating means in each of said print elements is disposed at a pole of said print element.

22. A print head according to claim 21 wherein said concentration means comprises a knife edge configuration of a pole, the knife edges of the elements of said first parallel array being transverse to the knife edges of said second parallel array to provide for a two-dimensional concentration of magnetic field at each cross point.

23. A print head according to claim 22 wherein the print elements of said first parallel array are spaced apart uniformly from the print elements of said second parallel array to define a passage between said first and said second parallel arrays for movement of said medium between the magnetic poles of the print elements of said first parallel array and the magnetic poles of the print elements of said second parallel array whereby magnetic flux of said combined magnetic field at a cross point passes from one of said parallel arrays through said medium to the other of said parallel arrays.

24. A print head according to claim 21 wherein said concentration means comprises pedestals upstanding from individual poles of the print elements of said first parallel array, said pedestals being located at said cross points.

25. A print head according to claim 24 wherein each of said pedestals has the shape of a cylinder to provide for a two-dimensional concentration of magnetic flux at a cross point, cylindrical axes of said pedestals being parallel.

26. A print head according to claim 25 wherein said concentration means further comprises elongated surfaces disposed on individual poles of the print elements of said second parallel array, said elongated surfaces being oriented normally to axes of said pedestals, the widths of said elongated surfaces being greater than a diameter of a pedestal to relax tolerances in the placement of said pedestals during a manufacturing process of the print head.

27. A print head according to claim 26 wherein the print elements of said first parallel array are spaced apart uniformly from the print elements of said second parallel array to define a passage between said first and said second parallel arrays for movement of said medium between the magnetic poles of the print elements of said first parallel array and the magnetic poles of the print elements of said second parallel array whereby magnetic flux of said combined magnetic field at a cross point passes from one of said parallel arrays through said medium to the other of said parallel arrays.

* * * * *